(12) United States Patent
Jin et al.

(10) Patent No.: US 9,264,175 B2
(45) Date of Patent: Feb. 16, 2016

(54) METHOD AND APPARATUS FOR DETECTING COLLISION IN WIRELESS MULTI-ACCESS CHANNEL

(71) Applicant: Electronics and Telecommunications Research Institute, Daejeon (KR)

(72) Inventors: Sung Geun Jin, Daejeon (KR); Byung Jae Kwak, Daejeon (KR); Jin Kyeong Kim, Daejeon (KR); Sung Cheol Chang, Daejeon (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 16 days.

(21) Appl. No.: 14/180,569

(22) Filed: Feb. 14, 2014

(65) Prior Publication Data

US 2014/0233411 A1    Aug. 21, 2014

(30) Foreign Application Priority Data

Feb. 15, 2013   (KR) .......................... 10-2013-0016526

(51) Int. Cl.
*H04W 72/04*   (2009.01)
*H04Q 7/00*   (2006.01)
*H04L 1/00*   (2006.01)
*H04L 1/16*   (2006.01)
*H04W 74/00*   (2009.01)

(52) U.S. Cl.
CPC ................ *H04L 1/00* (2013.01); *H04L 1/1607* (2013.01); *H04W 74/00* (2013.01)

(58) Field of Classification Search
USPC .......................... 370/210, 252, 280, 330, 338
See application file for complete search history.

(56) References Cited

U.S. PATENT DOCUMENTS 6,967,937 B1 * 11/2005 Gormley ........................ 370/330
2010/0202400 A1 * 8/2010 Richardson et al. .......... 370/330

FOREIGN PATENT DOCUMENTS

JP          2012-165076 A     8/2012

* cited by examiner

*Primary Examiner* — Edan Orgad
*Assistant Examiner* — Sithu Ko
(74) *Attorney, Agent, or Firm* — NSIP Law

(57) ABSTRACT

A method and an apparatus for detecting a collision in a wireless multi-access channel are disclosed. The method of detecting the collision in the wireless multi-access according to an exemplary embodiment includes generating a request-to-send (RTS) message by a transmission terminal, transmitting the RTS message to a reception terminal, and receiving a response message from the reception terminal and determining whether a collision occurs based on a number of pieces of tone information included in the response message.

9 Claims, 7 Drawing Sheets

METHOD AND APPARATUS FOR DETECTING COLLISION IN WIRELESS MULTI-ACCESS CHANNEL

CROSS-REFERENCE TO RELATED APPLICATION

This application claims the priority benefit of Korean Patent Application No. 10-2013-0016526, filed on Feb. 15, 2013, in the Korean Intellectual Property Office, the disclosure of which is incorporated herein by reference.

BACKGROUND

1. Field

The present invention relates to a method of detecting a transmission collision between terminals when at least two terminals access a wireless channel and transmit data simultaneously.

2. Description of Related Art

According to conventional art, when at least two terminals attempt transmission simultaneously and collide to fail to transmit data in a wireless channel, an acknowledgement (ACK) from a reception terminal does not arrive, which may be considered as a collision due to simultaneous connection to the channel. However, an ACK may also not be received even when the reception terminal fails to receive data due to a channel error. Current technology may not distinguish failure of transmission due to a collision from failure of transmission due to a channel error.

SUMMARY

An aspect of the present invention provides a method of identifying whether failure of data transmission is due to a transmission collision between terminals or due to a channel error when at least two terminals attempt to transmit data at the same time and fail to transmit data.

According to an aspect of the present invention, there is provided a method of detecting a data collision in a wireless multi-access channel, the method including generating a message including tone information by a transmission terminal, transmitting the message to a reception terminal, and receiving a response message from the reception terminal and determining whether a collision occurs based on a number of pieces of tone information included in the response message.

According to another aspect of the present invention, there is provided a method of detecting a data collision in a wireless multi-access channel, the method including receiving a message including tone information of a first transmission terminal and a second transmission terminal by a reception terminal, detecting the tone information included in the received message, and transmitting a response message including information on a detection result of the tone information to the first transmission terminal and the second transmission terminal.

According to an aspect of the present invention, there is provided an apparatus for detecting a data collision in a wireless multi-access channel, the apparatus including a message generation unit to generate a message including tone information, a communication unit to transmit the message and to receive a response message via the wireless channel, and a determination unit to determine whether a collision occurs based on a number of pieces of tone information included in the response message.

According to another aspect of the present invention, there is provided an apparatus for detecting a data collision in a wireless multi-access channel, the apparatus including a reception unit to receive a message including tone information of a first transmission terminal and a second transmission terminal by a reception terminal, a detection unit to detect the tone information included in the received message, and a transmission unit to transmit a response message including information on a detection result of the tone information to the first transmission terminal and the second transmission terminal.

As described above, a method of detecting a collision according to exemplary embodiments may identify whether failure of data reception is due to a collision between terminals or due to a channel error to detect a collision when a terminal fails to receive data. The method of detecting the collision is applied to contention based channel access in a multi-access channel, thereby enhancing transmission performance.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Hereinafter, exemplary embodiments of the present invention will be described in detail with reference to the accompanying drawings.

According to conventional art, when at least two terminals collide to fail to transmit data in a wireless channel, an acknowledgement (ACK) from a reception terminal does not arrive, which may be considered as a collision due to simultaneous connection to the channel. However, even when the reception terminal fails to receive data due to a channel error, an ACK from the reception terminal may also not arrive. The channel error to cause failure of data reception, such as to cause failure of ACK reception, may be misinterpreted as a collision. Thus, a method for a transmission terminal to distinguish the foregoing two causes of failure of ACK reception. The present invention provides a method of detecting a transmission collision between terminals, more particularly a method and an apparatus for detecting a collision in a wireless multi-access channel in which contention based channel access is conducted based on whether a collision occurs.

Figure 1:
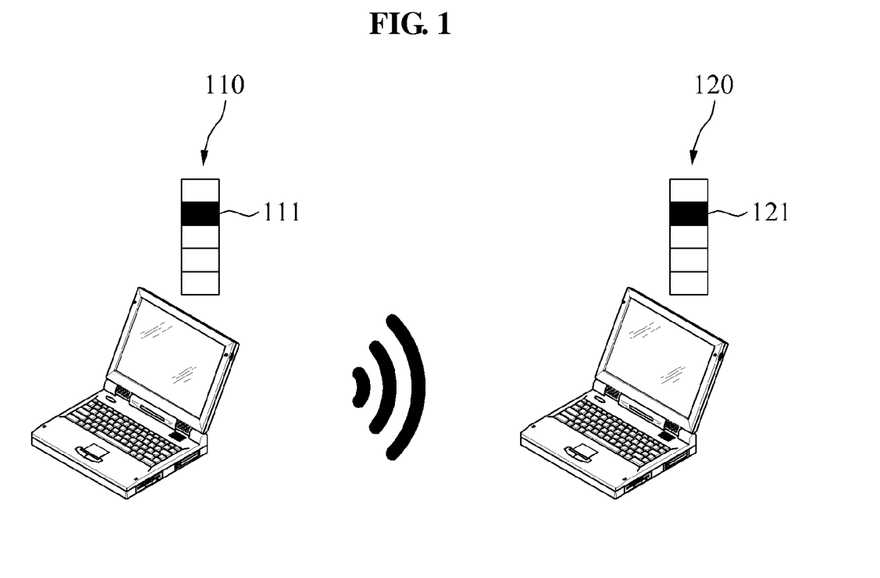
FIG. 1 illustrates a channel access method of a terminal when a collision does not occur.

FIG. 1 illustrates a channel access method of a terminal when a collision does not occur.

Referring to FIG. 1, when one transmission terminal 110 accesses one reception terminal 120, the transmission terminal may transmit tone information to the reception terminal 120 by including the tone information in a single predetermined sub-carrier among a plurality of sub-carriers.

For example, the transmission terminal 110 may transmit data using five sub-carriers. Here, the transmission terminal 110 may include the tone information in a second sub-carrier 111 among the five sub-carriers for transmission.

The reception terminal 120 receiving the sub-carriers may measure energy levels of the sub-carriers to detect the tone information. The reception terminal 120 may detect a sub-carrier 121 including the tone information among the sub-carriers transmitted from the transmission terminal 110. The tone information may be a signal that has only strength without phase information. Here, since no collision occurs, the reception terminal 120 may detect a single piece of tone information only.

Figure 2:
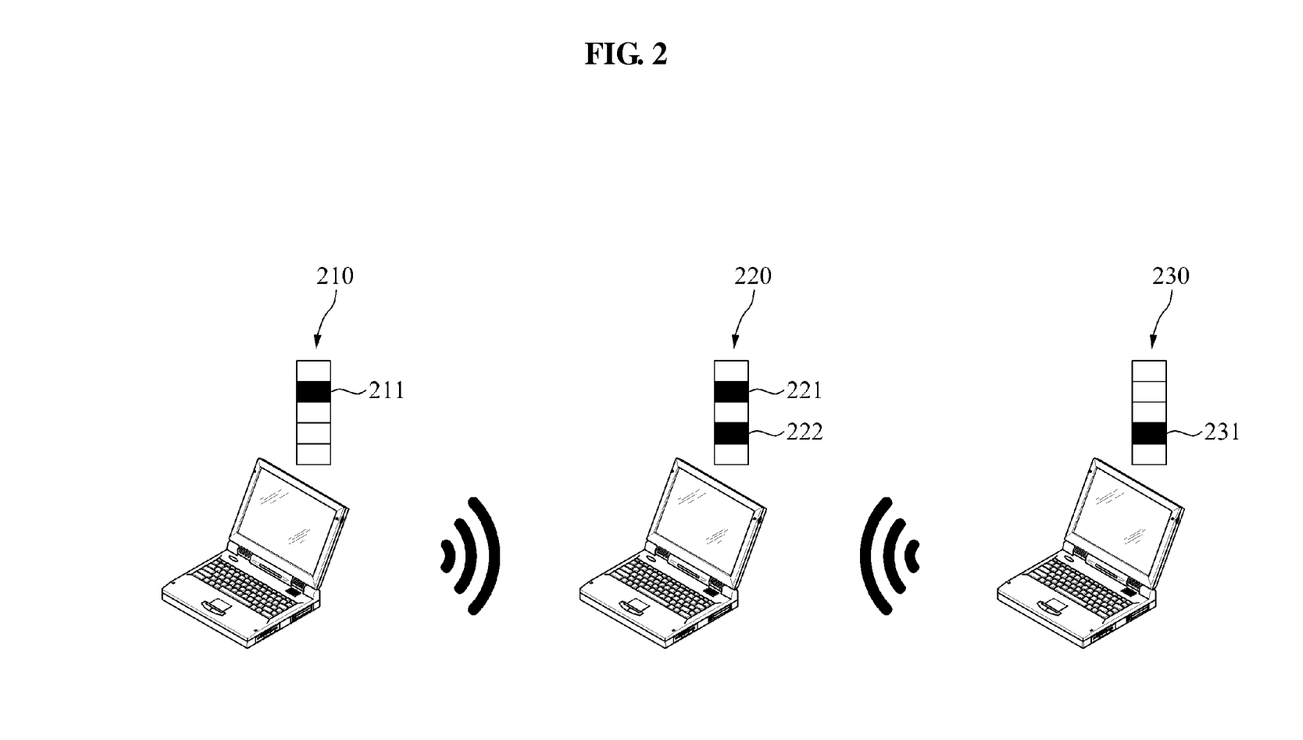
FIG. 2 illustrates a channel access method of a terminal when a collision occurs.

FIG. 2 illustrates a channel access method of a terminal when a collision occurs.

Referring to FIG. 2, when at least two transmission terminals 210 and 230 access one reception terminal 220, each transmission terminal may transmit tone information to the reception terminal 220 by including the tone information in a single predetermined sub-carrier of a plurality of sub-carriers.

Here, the transmission terminals may include the tone information in a request-to-send (RTS) message for transmission to the reception terminal 220. Further, the transmission terminals may transmit the tone information using an appropriate message aside from the RTS message.

For example, as shown in FIG. 1, the transmission terminals 210 and 230 may transmit data using five sub-carriers. Here, a first transmission terminal 210 may include the tone information in a second sub-carrier 211 among the five sub-carriers for transmission, and a second transmission terminal 230 may include the tone information in a fourth sub-carrier 231 among the five sub-carriers for transmission. The tone information may be combined on a channel and transmitted to the reception terminal 220. The reception terminal 220 receiving the sub-carriers may detect energy levels of the sub-carriers so as to detect the tone information. The reception terminal 220 may detect the sub-carriers that include the tone information among the sub-carriers received from the transmission terminals 210 and 230. Among the sub-carriers received from the respective transmission terminals 210 and 230, the second sub-carrier 221 and the fourth sub-carrier 222 include the respective tone information.

The reception terminal 220 may detect the tone information from the sub-carriers received from the transmission terminals 210 and 230. The reception terminal 220 may include the tone information in sub-carriers of the reception terminal 220. The reception terminal 220 may generate a response message using the sub-carriers including the tone information.

For example, the generated response message may include a plurality of sub-carriers. When the second sub-carrier 221 and the fourth sub-carrier 222 include the tone information among the sub-carriers received from the transmission terminals 210 and 230, the response message may include the tone information in the second sub-carrier 221 and the fourth sub-carrier 222. The generated response message may be transmitted to the transmission terminals 210 and 230.

The transmission terminals 210 and 230 may receive the response message and determine whether a collision occurs based a number of pieces of tone information included in the received response message. When the transmission terminals 210 and 230 collide, the transmission terminals 210 and 230 may reattempt channel access.

For instance, the transmission terminal 210 may wait for a preset time and reattempt channel access.

Figure 3:
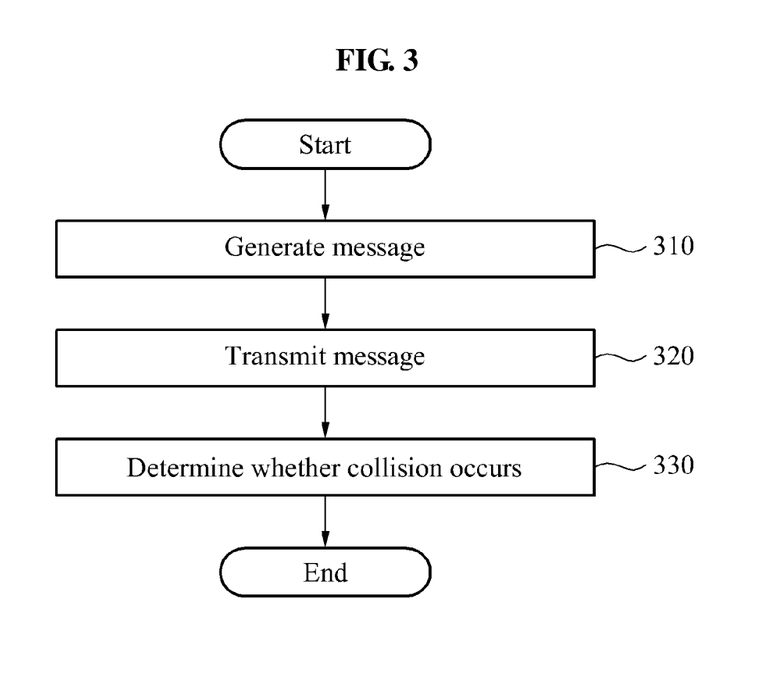
FIG. 3 is a flowchart illustrating a method of a transmission terminal detecting a data collision in a wireless multi-access channel according to an exemplary embodiment.

FIG. 3 is a flowchart illustrating a method of a transmission terminal detecting a data collision in a wireless multi-access channel according to an exemplary embodiment.

The detection method of FIG. 3 may be conducted by the transmission terminal.

For example, in operation 310, the transmission terminal may generate an RTS message.

Here, the transmission terminal may generate the RTS message using a modulation method of loading tone information onto a plurality of sub-carriers. The modulation method may be orthogonal frequency division multiplexing (OFDM). Further, the transmission terminal may generate the tone information using an appropriate message aside from the RTS message.

In operation 320, the transmission terminal may transmit the RTS message generated in operation 310 to a reception terminal. The RTS may include the plurality of sub-carriers including the tone information. The tone information may be a signal which has only strength without phase information. The tone information may be used to determine whether the transmission terminal collides with another terminal.

In operation 330, the transmission terminal may receive a response message from the reception terminal and determine whether a collision occurs based on a number of pieces of tone information included in the response message.

The transmission terminal may determine whether a collision occurs based on the tone information. The reception terminal may transmit the response message including tone information on each transmission terminal to the transmission terminal. The transmission terminal may receive the response message and determine whether a collision occurs based on the number of pieces of tone information included in the response message.

For example, the transmission terminal may determine that a collision occurs when the response message includes a plurality pieces of tone information.

Figure 4:
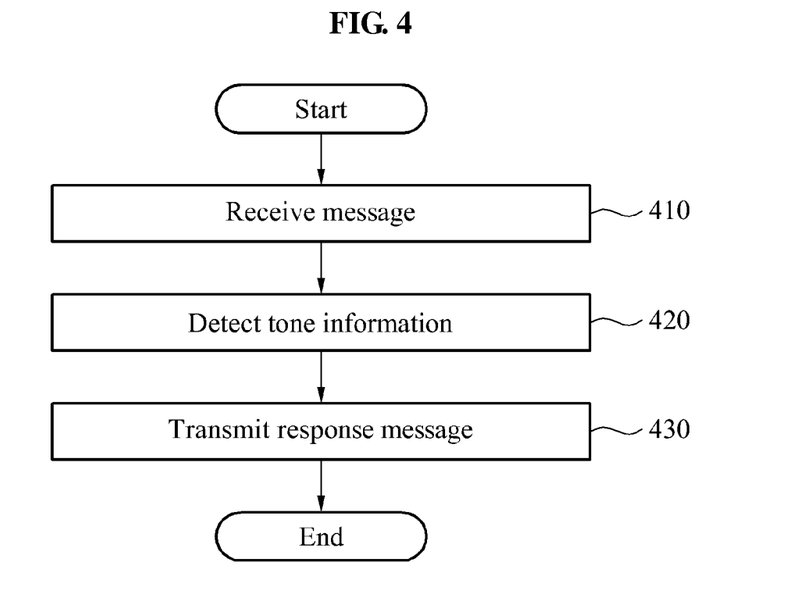
FIG. 4 is a flowchart illustrating a method of a reception terminal detecting a data collision in a wireless multi-access channel according to an exemplary embodiment.

FIG. 4 is a flowchart illustrating a method of a reception terminal detecting a data collision in a wireless multi-access channel according to an exemplary embodiment.

The detection method of FIG. 4 may be conducted by the reception terminal.

In operation 410, when at least two transmission terminals access one reception terminal, the reception terminal may receive an RTS message from each transmission terminal. Further, the reception terminal may receive tone information using an appropriate message, aside from the RTS message.

For example, the reception terminal may receive a first RTS message transmitted by a first transmission terminal and a second RTS transmitted by a second transmission terminal by combining the messages on a channel. Here, the RTS messages may include sub-carriers including tone information.

In operation 420, the reception terminal may detect the tone information from the sub-carriers included in the received messages.

The reception terminal may detect the sub-carriers including the tone information among the received sub-carriers. The tone information may be a signal that has only strength without phase information. Thus, the reception terminal may detect the tone information by detecting an energy level based on sizes of the tone information.

In operation 430, the reception terminal may transmit a response message including information on a detection result of the tone information to the first transmission terminal and the second transmission terminal.

The reception terminal may generate the response message including the tone information on the transmission terminals detected in operation 420. The response message may include the plurality of sub-carriers including the tone information. The reception terminal may transmit the response message to the transmission terminals.

Figure 5:
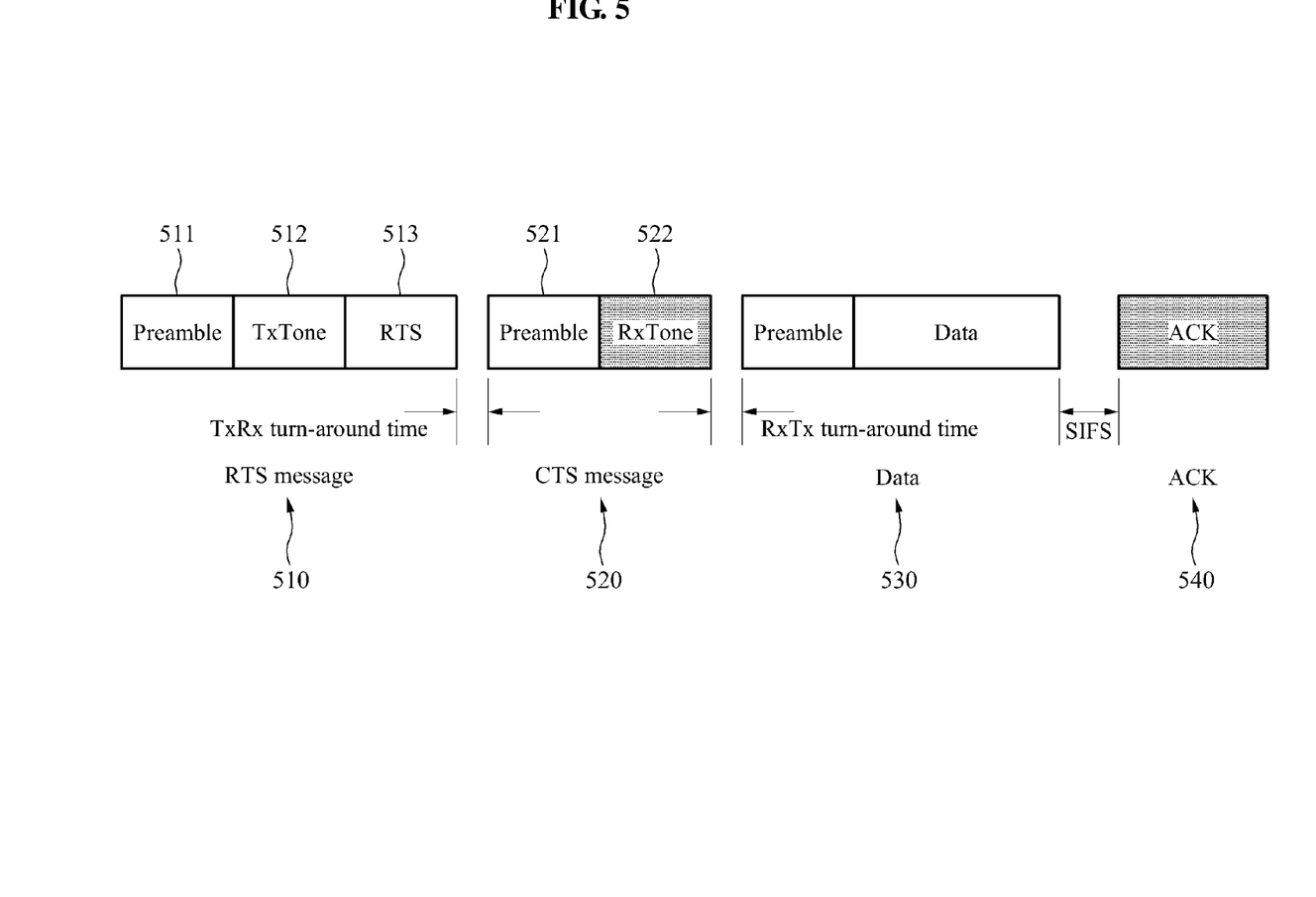
FIG. 5 illustrates a configuration of a message communicated between a transmission terminal and a reception terminal according to an exemplary embodiment.

FIG. 5 illustrates a configuration of a message communicated between a transmission terminal and a reception terminal according to an exemplary embodiment. The message communicated between the transmission terminal and the reception terminal may be also configured in an alternative appropriate combination, aside from the configuration illustrated in FIG. 5.

The message communicated between the transmission terminal and the reception terminal may include an RTS message 510, a clear-to-send (CTS) message 520, data 530 and an ACK 540.

The RTS message 510 may include a preamble 511, a transmission tone field (TxTone) 512 and an RTS field 513.

The transmission preamble 511 may include information on bits of data of the transmission terminal and an identifier (ID) of the terminal.

The transmission tone field 512 may include a plurality of sub-carriers including tone information. The RTS message 510 may include the transmission tone filed 512, and the transmission tone field 512 may include tone information in a single predetermined sub-carrier among the sub-carriers.

The RTS field 513 may include information indicating the RTS message.

The transmission terminal may transmit the tone information to the reception terminal by including the tone information in the transmission tone field 510 including the sub-carriers. Here, the RTS message 510 may include the transmission tone field 512 between the transmission preamble 511 and the RTS field 513.

The CTS message 520 may include a reception preamble 520 and a reception tone field (RxTone) 522. Also, the CTS message 520 may further include a CTS field.

The reception preamble 521 may include information on bits of data of the reception terminal and an ID of the terminal.

The reception tone field 522 may include a plurality of sub-carriers including tone information.

The CTS field may include information indicating the CTS message.

The reception terminal may receive the RTS message and detect the tone information. The reception terminal may transmit, to the transmission terminal, the CTS message 520 as a response message to determine whether a collision occurs based on a number of detected tone information. When at least two pieces of tone information are included in the reception tone field 522 of the transmitted CTS message 520, the reception terminal may determine that a collision occurs.

The data 530 may include data to be communicated between the transmission terminal and the reception terminal via a wireless channel.

Figure 6:
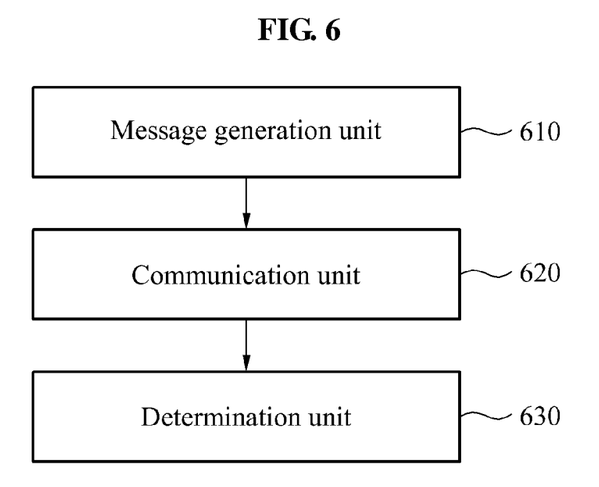
FIG. 6 illustrates a configuration of a transmission terminal according to an exemplary embodiment.

FIG. 6 illustrates a configuration of a transmission terminal according to an exemplary embodiment.

Referring to FIG. 6, the transmission terminal may include a message generation unit 610, a communication unit 620 and a determination unit 630.

The message generation unit 610 may generate a message including tone information to be transmitted to a reception terminal. The message generation unit 610 may modulate the tone information so that the transmission terminal to access a channel of the reception terminal may load the tone information onto a plurality of sub-carriers. Here, the tone information may be included in a single predetermined sub-carrier among the sub-carriers. The modulation method may be OFDM.

The communication unit 620 may transmit the message generated by the message generation unit 610 via a wireless channel. Further, the communication unit 620 may receive a response message to determine whether a collision occurs from the reception terminal.

The determination unit 630 may determine whether a collision occurs based on a number of pieces of tone information included in the received response message. For example, when the received response message includes at least two pieces of tone information, the determination unit 630 may determine that a collision occurs. When the determination unit 630 determines that a collision occurs, transmission terminals may reattempt contention based channel access.

Figure 7:
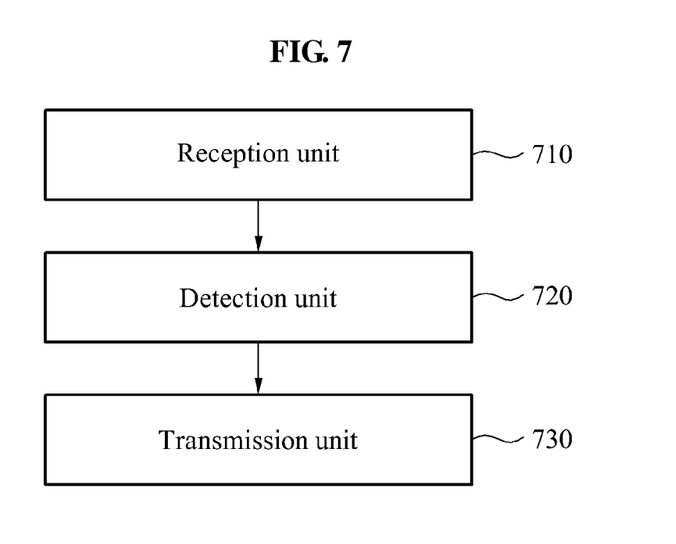
FIG. 7 illustrates a configuration of a reception terminal according to an exemplary embodiment.

FIG. 7 illustrates a configuration of a reception terminal according to an exemplary embodiment.

Referring to FIG. 7, the reception terminal may include a reception unit 710, a detection unit 720 and a transmission unit 730.

The reception unit 710 may receive a message including tone information of a first transmission terminal and a second transmission terminal. The message may include a plurality of sub-carriers. The message may include the plurality of sub-carriers, and the sub-carriers may include the tone information of the first transmission terminal and the second transmission terminal combined on a channel.

The detection unit 720 may detect the tone information of the sub-carriers included in the received message. The tone information may be a signal that has only strength without phase information. Thus, the detection unit 720 may detect the tone information by detecting an energy level from the tone information.

The transmission unit 730 may transmit a response message including information on a detection result of the tone information to the first transmission terminal and the second transmission terminal. Occurrence of a collision may be determined based on a number of pieces of tone information included in the received response message.

The methods according to the above-described exemplary embodiments of the present invention may be recorded in non-transitory computer-readable media including program instructions to implement various operations embodied by a computer. The media may also include, alone or in combination with the program instructions, data files, data structures, and the like. The program instructions recorded in the media may be designed and configured specially for the exemplary embodiments or be known and available to those skilled in computer software. Examples of non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, other implementations, alternative embodiments and equivalents to the claimed subject matter are construed as being within the appended claims.

What is claimed is:

1. A method of detecting a data collision at a transmission terminal in a wireless multi-access channel, the method comprising:
   generating a message including tone information by the transmission terminal;
   transmitting the generated message to a reception terminal;
   receiving a response message from the reception terminal, the response message comprising the tone information of the generated message; and
   determining that a collision occurs when a plurality of pieces of tone information is included in the response message,
   wherein the tone information of the generated message comprises only strength without phase information.

2. The method of claim 1, wherein the generated message comprises a plurality of sub-carriers and the tone information in a single predetermined sub-carrier among the sub-carriers.

3. A method of detecting a data collision in a wireless multi-access channel, the method comprising:
   receiving a message including tone information of a first transmission terminal and a second transmission terminal by a reception terminal;
   detecting the tone information included in the received message; and
   transmitting a response message to the first transmission terminal and the second transmission terminal to determine whether a collision occurs at the first transmission terminal and the second transmission terminal, the response message comprising the tone information included in the received message,
   wherein the tone information included in the received message comprises only strength without phase information.

4. The method of claim 3, wherein the received message comprises a plurality of sub-carriers, and the sub-carriers include the tone information of the first transmission terminal and the second transmission terminal by combining the tone information on the channel.

5. The method of claim 3, wherein the response message comprises a plurality of sub-carriers, and the sub-carriers comprise the tone information of the first transmission terminal and the second transmission terminal.

6. An apparatus for detecting a data collision in a wireless multi-access channel, the apparatus comprising:
   a message generation device configured to generate a message including tone information;
   a communication device configured to transmit the generated message and to receive a response message via the wireless channel, the response message comprising the tone information of the generated message; and
   a determination device configured to determine that a collision occurs when a plurality of pieces of tone information is included in the response message,
   wherein the plurality of pieces of tone information included in the response message comprises only strength without phase information.

7. The apparatus of claim 6, wherein the apparatus modulates the generated message including the tone information formed of a plurality of sub-carriers to include the tone information in a single predetermined sub-carrier among the sub-carriers.

8. An apparatus for detecting a data collision in a wireless multi-access channel, the apparatus comprising:
   a reception device configured to receive a message including tone information of a first transmission terminal and a second transmission terminal by a reception terminal;
   a detection device configured to detect the tone information included in the received message; and
   a transmission device configured to transmit a response message to the first transmission terminal and the second transmission terminal to determine whether a collision occurs at the first transmission terminal and the second transmission terminal, the response message comprising the tone information included in the received message,
   wherein the tone information included in the received message comprises only strength without phase information.

9. The apparatus of claim 8, wherein the detection device generates the response message by detecting energy levels of the detected tone information.

* * * * *